(12) United States Patent
Litwinski

(10) Patent No.: US 6,780,525 B2
(45) Date of Patent: Aug. 24, 2004

(54) HIGH STRENGTH FRICTION STIR WELDING

(75) Inventor: Edward Litwinski, Mission Viejo, CA (US)

(73) Assignee: The Boeing Company, Seattle, WA (US)

(*) Notice: Subject to any disclaimer, the term of this patent is extended or adjusted under 35 U.S.C. 154(b) by 182 days.

(21) Appl. No.: 10/035,865

(22) Filed: Dec. 26, 2001

(65) Prior Publication Data

US 2003/0116608 A1 Jun. 26, 2003

(51) Int. Cl.$^7$ .................... B32B 15/01; B23K 20/12
(52) U.S. Cl. ............... 428/615; 228/2.1; 228/112.1; 148/694
(58) Field of Search ............... 228/112.1, 2.1; 428/544, 615; 148/621, 333, 417, 694, 405

(56) References Cited

U.S. PATENT DOCUMENTS

| | | | | |
|---|---|---|---|---|
| 5,460,317 A | * | 10/1995 | Thomas et al. | 228/112.1 |
| 5,829,664 A | * | 11/1998 | Spinella et al. | 228/112.1 |
| 6,168,066 B1 | * | 1/2001 | Arbegast | 228/102 |
| 6,168,067 B1 | | 1/2001 | Waldron et al. | |
| 6,264,088 B1 | * | 7/2001 | Larsson | 228/2.1 |
| 6,398,883 B1 | * | 6/2002 | Forrest et al. | 148/516 |
| 6,457,629 B1 | * | 10/2002 | White | 228/112.1 |
| 6,516,992 B1 | * | 2/2003 | Colligan | 228/112.1 |
| 6,543,671 B2 | * | 4/2003 | Hatten et al. | 228/112.1 |
| 6,554,175 B1 | * | 4/2003 | Thompson | 228/112.1 |
| 6,585,148 B2 | * | 7/2003 | Aono et al. | 228/112.1 |
| 2002/0079351 A1 | * | 6/2002 | Mishra et al. | |
| 2002/0121319 A1 | * | 9/2002 | Chakrabarti et al. | |
| 2003/0042292 A1 | * | 3/2003 | Hatten et al. | |
| 2003/0072671 A1 | * | 4/2003 | Kuehmann et al. | |
| 2003/0085257 A1 | * | 5/2003 | James et al. | |
| 2003/0111515 A1 | * | 6/2003 | Scheglmann et al. | |
| 2003/0116608 A1 | * | 6/2003 | Litwinski | |

FOREIGN PATENT DOCUMENTS

| | | | |
|---|---|---|---|
| EP | 0 810 056 A2 | | 12/1997 |
| EP | 1 160 029 A1 | | 12/2001 |
| EP | 1240969 A2 | * | 9/2002 |
| JP | 410225781 A | * | 8/1998 |
| JP | 2002316275 A | * | 10/2002 |
| JP | 2003080381 A | * | 2/2003 |
| JP | 2003094175 A | * | 4/2003 |
| WO | WO 98/51441 | * | 11/1998 |
| WO | WO 99/39861 A | * | 8/1999 |
| WO | WO/02/074479 A1 | | 9/2002 |
| WO | WO 03/015975 A1 | * | 2/2003 |
| WO | WO 03/035320 A1 | * | 5/2003 |

OTHER PUBLICATIONS

US 2003/0116609A1 (Jun. 26, 2003).*
T. Fukuda, *Friction stir welding(FSW) process*; Welding International, Welding Institiute, Abington, GB. vol. 15, No. 8, 2001, pp. 611–615 (XP–001058539). ISSN: 0950–7116.
European Search Report, Jun. 17, 2003.

* cited by examiner

Primary Examiner—Kiley Stoner
(74) Attorney, Agent, or Firm—Alston & Bird LLP

(57) ABSTRACT

A precipitation hardened structural assembly is provided, including a first structural member and a second structural member positioned adjacent to the first structural member such that the first and second structural members define an interface therebetween. At least one friction stir weld joint joins the first structural member to the second structural member at least partially along the interface. The first and second structural members and the friction stir weld joint are solution heat treated at a first predetermined temperature schedule and precipitation heat treated at a second predetermined temperature schedule and wherein the friction stir weld joint comprises a refined grain structure having grain size of less than about 5 microns.

33 Claims, 10 Drawing Sheets

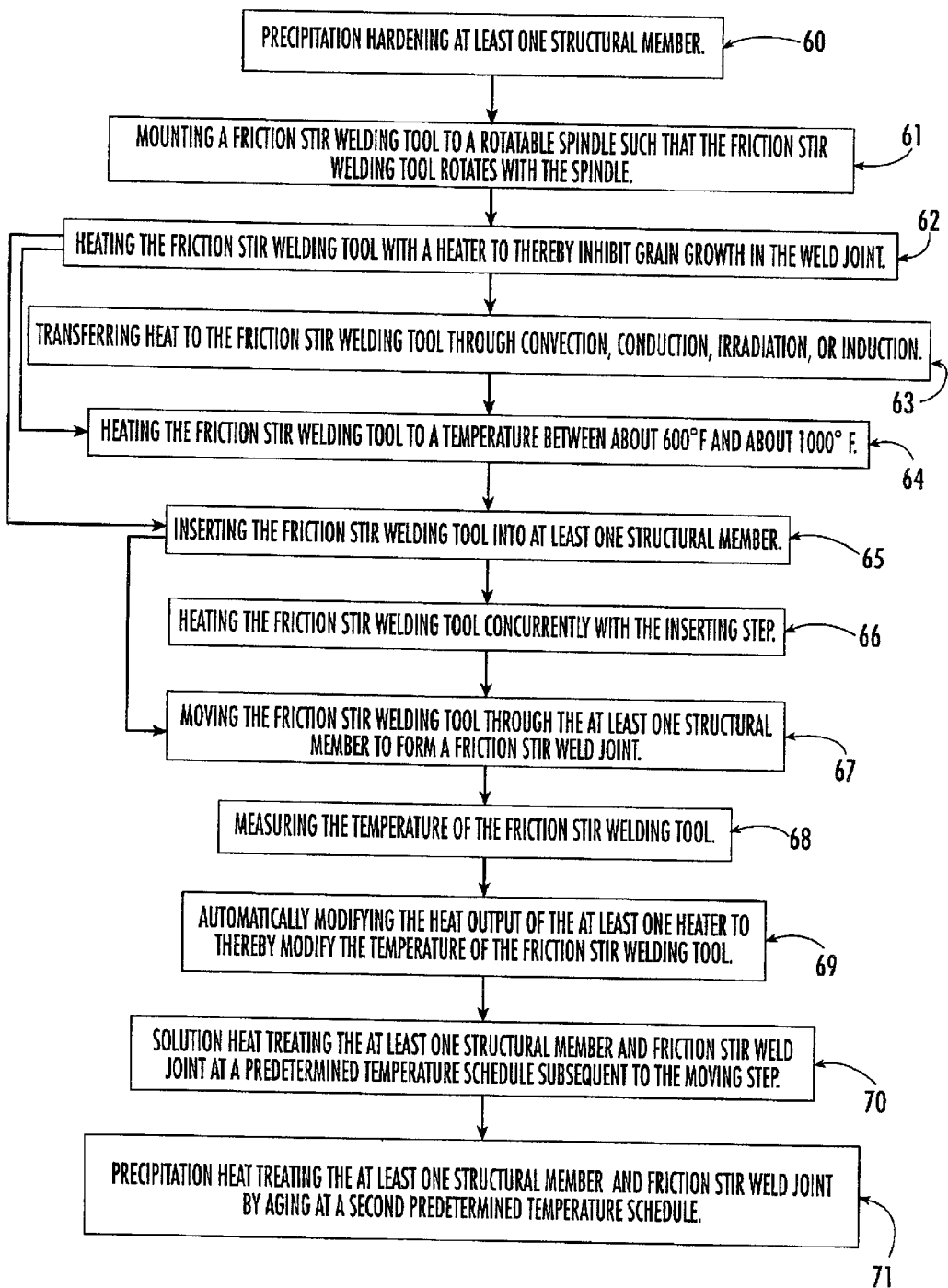

HIGH STRENGTH FRICTION STIR WELDING

FIELD OF THE INVENTION

The present invention relates to high strength friction stir welding and, more particularly, relates to reducing material property degradation of friction stir weld joints during subsequent heat treatments.

BACKGROUND OF THE INVENTION

Friction stir welding is utilized to join workpieces to form structural assemblies that can be used in the manufacture of military and commercial aircraft, as well as in other applications requiring high strength weld joints. As illustrated in FIG. 1, friction stir welding involves inserting the threaded pin 10a of a rotating friction stir welding tool 10 between the opposing faces of a pair of workpieces 12, 14 while urging the workpieces together. Friction stir welding can also be used to repair cracks or other defects in a single workpiece. The rotation of the threaded pin 10a between the opposing faces of the workpieces 12, 14, or within a single workpiece, creates friction that generates sufficient heat energy to plasticize the workpiece material in the weld zone 16. The friction stir welding tool 10 also includes a concave shoulder adapted to consolidate the plasticized workpiece material within the weld zone 16 as the friction stir welding tool is moved along the interface 11 between workpieces or through a single workpiece. A friction stir weld joint 18 forms, joining the workpieces together in a unitary assembly, as the plasticized regions of the workpieces 12, 14 flow together and cool in the weld zone 16. See U.S. Pat. No. 5,460,317 to Thomas et al. for a general discussion of friction stir welding, the entire contents of which are incorporated herein by reference.

One particular benefit of friction stir welding is that the formation of the weld joint 18 is autogenous and is created by the solidification of the plasticized parent materials rather than a filler material, as is commonly used in conventional welding processes. In addition, as illustrated in FIG. 2A, the friction stir weld joint 18 comprises a nugget having a refined grain structure with grains having an equiaxed shape and grain sizes ranging in order of magnitude from approximately 0.0001 to 0.0002 inches (approximately 3 to 5 microns). As a result of the improved grain structure, the friction stir weld joint 18 resists the formation and propagation of micro-cracks and exhibits improved strength, ductility and toughness, as well as improved corrosion and fatigue resistance.

The frictional heat necessary to plasticize the workpiece material during friction stir welding can degrade the material properties of the parent materials. As shown in FIG. 1, during friction stir welding, the frictional heat created by the rotating friction stir welding tool 10 is conducted from the weld zone 16 through the workpieces 12, 14 into the ambient environment, creating a heat-affected region 20 around the weld zone 16. The elevated temperatures associated with the friction stir welding process can degrade the material properties of the parent materials, including the strength, stiffness, and ductility of the workpieces 12, 14.

Material property degradation is particularly problematic when friction stir welding precipitation hardened parent materials, which have improved mechanical properties obtained through solution and precipitation heat treatments. When friction stir welding precipitation hardened workpieces 12, 14, the joined workpieces commonly require additional precipitation hardening or a resolution heat treatment to recover the parent material properties. The resolution heat treatment includes solution heat treating the workpieces 12, 14 at a predetermined temperature schedule and then rapidly cooling the workpieces by quenching. The solution heat treating process is then followed by a precipitation heat treatment involving either natural or artificial aging at a second predetermined temperature schedule to recover the parent material properties. While resolution heat treating improves the material properties of the joined workpieces 12, 14, the resolution heat treatment typically results in appreciable grain growth in the friction stir weld joint 18, as illustrated by a comparison of FIGS. 2A and 2B. For example, friction stir weld joints 18 commonly have grain sizes of up to 0.25 inches after the resolution heat treatment. The large grains in the friction stir weld joint 18 resulting from the resolution heat treatment adversely affect the material properties of the weld joint, including reducing the hardness, ductility, resistance to intergranular corrosion, and fatigue resistance.

In seeking to minimize the degradation of the material properties of friction stir weld joints 18 during post weld heat treatments, several alternative approaches have been proposed, including shortening the duration of the solution heat treatment, post-weld annealing prior to solution heat treatment, and surface peening. However, these approaches have not been effective in reducing the grain growth of friction stir weld joints 18 during post-weld solution heat treatments.

Thus, there is a need for improved methods and apparatus for friction stir welding heat treated materials and, in particular, precipitation hardened materials. Such manufacturing methods and apparatus should realize the improved material properties associated with resolution heat treating while minimizing degradation of the material properties of the friction stir weld joint during such heat treatments.

SUMMARY OF THE INVENTION

The present invention provides an improved precipitation hardened structural assembly formed by friction stir welding and a method and apparatus of forming the same. According to one embodiment of the present invention, a precipitation hardened structural assembly is provided, including a first structural member and a second structural member positioned adjacent to the first structural member such that the first and second structural members define an interface therebetween. At least one friction stir weld joint joins the first structural member to the second structural member at least partially along the interface. The first and second structural members and the friction stir weld joint are solution heat treated at a first predetermined temperature schedule and precipitation heat treated at a second predetermined temperature schedule and wherein the friction stir weld joint comprises a refined grain structure having a grain size of less than about 5 microns. In one embodiment, the first and second structural members comprise dissimilar materials. In another embodiment, at least one of the first and second structural members is formed from aluminum, aluminum alloys, titanium, or titanium alloys.

The present invention also provides an apparatus for attachment to a rotatable spindle for forming a friction stir weld joint. In one embodiment, according to the present invention, the apparatus includes a friction stir welding tool in rotatable communication with the spindle. The friction stir welding tool defines a cavity. The apparatus includes at least one heater adapted to thermally communicate with the friction stir welding tool to thereby heat the tool and wherein the at least one heater is at least partially received in the cavity of the friction stir welding tool. The at least one heater can include a resistance heating coil, an induction heating coil, a quartz lamp, a gas torch, or a laser. In one embodiment, the at least one heater thermally communicates with the friction stir welding tool through convection, conduction, irradiation or induction. In another embodiment, the apparatus includes a sensor in thermal communication with the friction stir welding tool for measuring the temperature of the friction stir welding tool. In yet another embodiment, the apparatus includes a controller in electrical communication with the sensor and in operable communication with the at least one heater. The controller is configured to automatically modify the heat output of the at least one heater to modify the temperature of the friction stir welding tool.

In another embodiment, the present invention provides an apparatus for friction stir welding at least one structural member, including a machine having a rotatable spindle. A friction stir welding tool is in rotatable communication with the spindle. The apparatus includes at least one heater adapted to thermally communicate with the friction stir welding tool to thereby heat the tool and wherein the at least one heater is structured so as to be electrically insulated from the at least one structural member. The at least one heater can include a resistance heating coil, an induction heating coil, a quartz lamp, a gas torch, or a laser. In one embodiment, the friction stir welding tool defines a cavity adapted to at least partially receive the at least one heater. In another embodiment, the at least one heater is spaced from the friction stir welding tool. In another embodiment, the at least one heater thermally communicates with the friction stir welding tool through convection, conduction, irradiation or induction. In yet another embodiment, the apparatus includes a sensor in thermal communication with the friction stir welding tool for measuring the temperature of the friction stir welding tool. In still another embodiment, the apparatus includes a controller in electrical communication with the sensor and in operable communication with the at least one heater. The controller is configured to automatically modify the heat output of the at least one heater to modify the temperature of the friction stir welding tool.

The present invention also provides a method of forming a friction stir weld joint, including mounting a friction stir welding tool to a rotatable spindle such that the friction stir welding tool rotates with the spindle. The friction stir welding tool is heated with at least one heater to thereby inhibit grain growth in the weld joint. Subsequent to the heating step, the friction stir welding tool is inserted into at least one structural member. The friction stir welding tool is moved through the at least one structural member to form the friction stir weld joint. In one embodiment, the method includes heating the friction stir welding tool concurrently with the inserting step. According to another embodiment, the at least one structural member is precipitation hardened prior to the inserting step. In yet another embodiment, the at least one structural member and friction stir weld joint are solution heat treated at a predetermined temperature schedule subsequent to the moving step. Thereafter, the at least one structural member and friction stir weld joint are precipitation heat treated by aging at a second predetermined temperature schedule. According to another embodiment, the heating step comprises transferring heat to the friction stir welding tool through convection, conduction, irradiation, or induction. In another embodiment, the heating step comprises heating the friction stir welding tool to a temperature between about 600° F. and about 1000° F. In yet another embodiment, the method includes measuring the temperature of the friction stir welding tool. In still another embodiment, the method includes automatically modifying the heat output of the at least one heater to thereby modify the temperature of the friction stir welding tool.

The present invention also provides a method of manufacturing a structural assembly, including forming a friction stir weld joint in at least one structural member using a rotating friction stir welding tool. The method includes heating the friction stir weld tool prior to and during the forming step with at least one heater to thereby inhibit grain growth in the weld joint. In one embodiment, the forming and heating steps are repeated to thereby join at least one additional structural member to the structural assembly. In another embodiment, the at least one structural member is precipitation hardened at a predetermined temperature schedule prior to the forming step. In still another embodiment, the structural assembly is solution heat treated at a predetermined temperature schedule subsequent to the forming step. Thereafter, the structural assembly is precipitation heat treated by aging at a second predetermined temperature schedule. According to another embodiment, the heating step comprises transferring heat to the friction stir welding tool through convection, conduction, irradiation, or induction. In another embodiment, the heating step comprises heating the friction stir welding tool to a temperature between about 600° F. and about 1000° F. In yet another embodiment, the method includes measuring the temperature of the friction stir welding tool. In still another embodiment, the method includes automatically modifying the heat output of the at least one heater to thereby modify the temperature of the friction stir welding tool.

Accordingly, the present invention provides an improved precipitation hardened structural assembly having one or more friction stir weld joints with refined grain structure and a method and apparatus for constructing the same. The method and apparatus for constructing the structural assembly minimize degradation of the material properties of the friction stir weld joint during subsequent resolution heat treatments thereby effectively realizing the improved material properties associated with both friction stir welding and precipitation hardening.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 7 is a flow chart illustrating a method of forming a friction stir weld joint, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
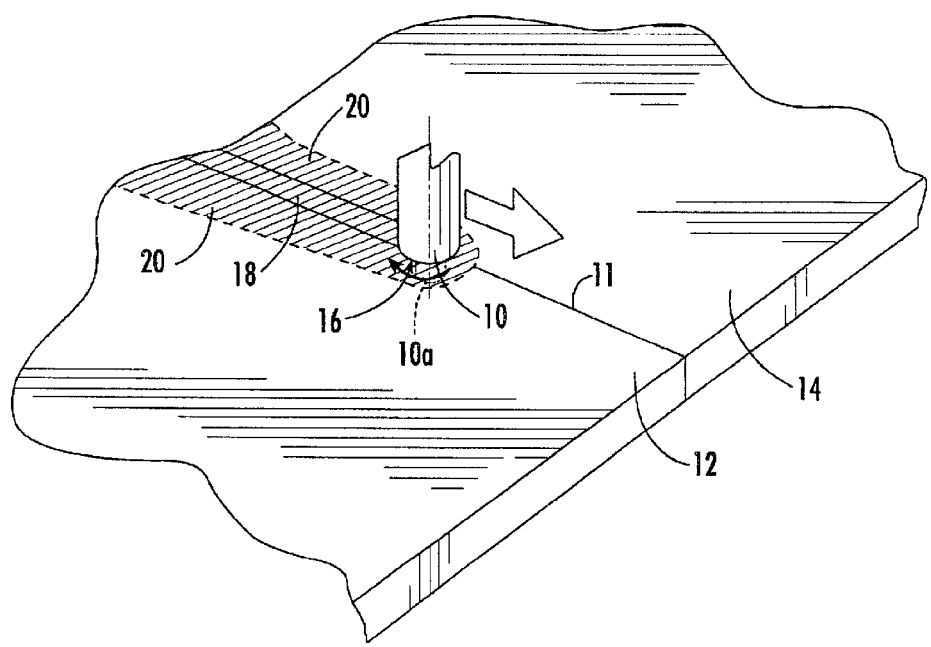
FIG. 1 is a perspective view illustrating the joining of two structural members using friction stir welding, as is known in the art.
Figure 3:
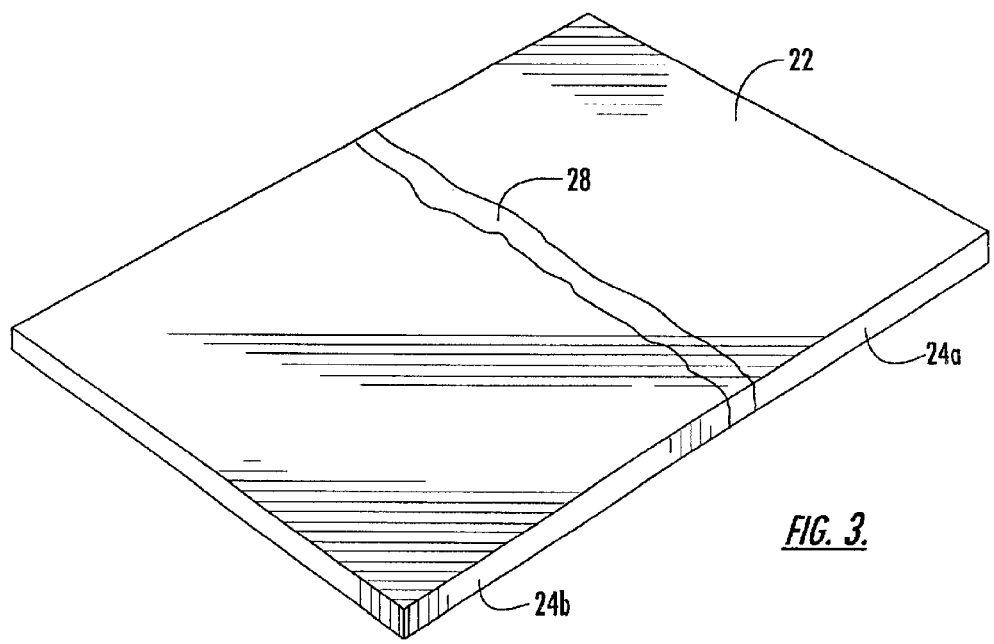
FIG. 3 is a perspective view illustrating a structural assembly, according to one embodiment of the present invention.
Figure 2A:
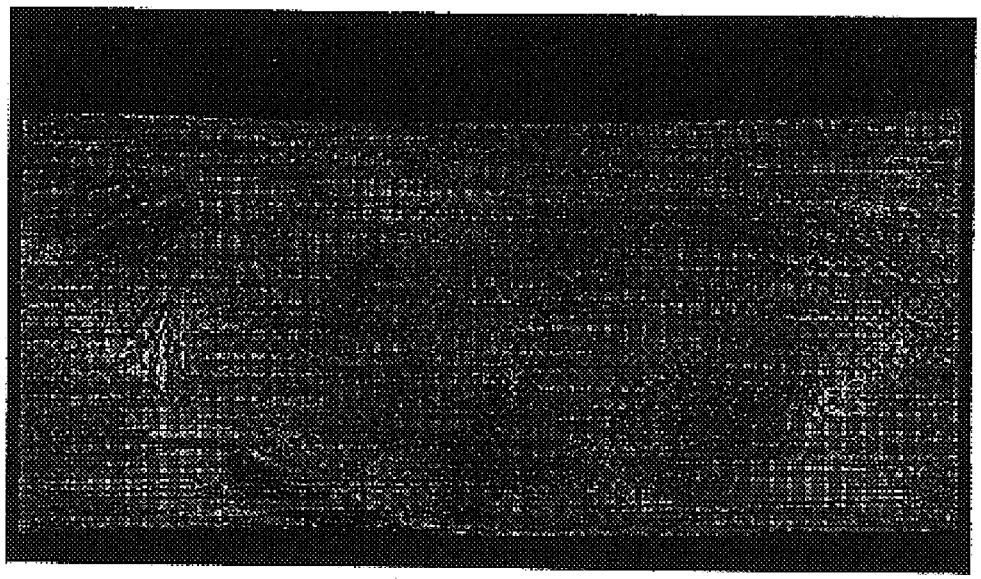
FIG. 2A is a photocopy of a photograph illustrating the grain structure of a friction stir weld joint prior to resolution heat treating, as is known in the art.
Figure 2B:
FIG. 2B is a photocopy of a photograph illustrating the grain structure of a friction stir weld joint subsequent to resolution heat treating, as is known in the art.

Referring now to the drawings, and in particular to FIG. 3, there is shown a structural assembly 22, according to one embodiment of the present invention. The structural assembly is formed of first and second structural members 24a, 24b joined at least partially along an interface defined between the structural members by a friction stir weld joint 28. In other embodiments (not shown), the structural assembly 22 can be formed of a single structural member 24 or three or more structural members wherein the friction stir weld joint 28 is formed to repair a crack or other defect in a structural member or is formed to join the structural members, respectfully. In still another embodiment (not shown), the friction stir weld joint 28 can be formed to provide a region of refined grain structure within a second region of a structural member 24 having comparatively high operational stress. See copending U.S. patent application Ser. No. 09/589,505 filed on Jun. 7, 2001, which is assigned to the assignee of the present invention, for a general discussion of friction stir grain refinement of structural members, the entire contents of which are incorporated herein by reference.

Each structural member 24 can be machined, through known manufacturing means, from a single workpiece into a predetermined shape and thickness as required by the specific design loads and specifications of the resulting structural assembly 22. For example, a CNC milling machine can be used to machine each structural member 24, as necessary. The structural members 24 can be manufactured in variety of configurations, including, for purposes of example only and not limitation, plates, blocks, tubular members and curvilinear members. Similarly, each structural member 24 can be formed of a variety of materials, as required by the specific design loads hi and specifications of the resulting structural assembly 22. The structural members 24 are formed of materials that can be precipitation hardened, as discussed more fully below, and preferably are formed of materials having high strength to weight ratios, including, for purposes of example only and not limitation, aluminum, aluminum alloys, titanium, and titanium alloys.

For structural assemblies 22 formed of two or more structural members 24a, 24b, the structural members can be formed of either similar or dissimilar metals. Advantageously, since the structural members 24a, 24b are joined by friction stir welding, the structural members can be formed of dissimilar metals that would be unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits structural members 24a, 24b formed of unweldable materials to be securely joined. Friction stir welding also can be used to securely join weldable materials to other weldable and to unweldable materials. Thus, the method of the present invention permits the materials that form the structural members 24a, 24b to be chosen from a wider variety of light weight, high strength metals and alloys, thereby facilitating reduction of the overall weight of the resulting structural assembly 22. Weight and strength are of critical concern in the aerospace industry.

In order to improve the material properties of the structural member or members 24, including strength, hardness, and corrosion resistance, one or more of the structural members can be precipitation hardened prior to forming the structural assembly 22 and then the entire structural assembly resolution heat treated. In another embodiment, the structural assembly 22 is precipitation hardened after being formed, but the individual structural members 24 are not precipitation hardened prior to forming the assembly. Precipitation hardening of metal alloys is a process whereby the mechanical properties of the metal alloy are improved by the formation of uniformly dispersed particles or precipitates of one or more secondary phases within the original phase matrix. Precipitation hardening requires that the metal alloy undergo two heat treatment processes, the first process being a solution heat treatment and the second process being a precipitation heat treatment.

Figure 4A:
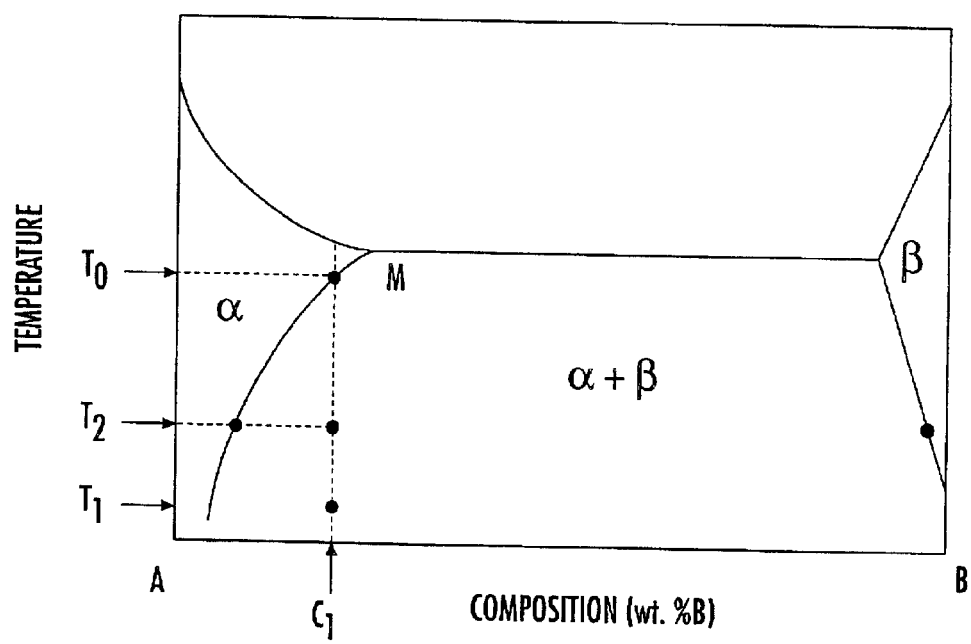
FIG. 4A is a hypothetical phase diagram for a precipitation-hardenable binary metal alloy system.

Referring to FIG. 4A, there is shown a hypothetical phase diagram for a precipitation-hardenable metal alloy composed of alloying elements A and B. Although FIG. 4A illustrates a phase diagram for a binary system, precipitation-hardenable metal alloys may contain two or more alloying elements. For a metal alloy to be precipitation hardenable, the alloy must have an appreciable maximum solubility of one element in the other, on the order of several percent, and a solubility limit that rapidly decreases in concentration of the major element with temperature reduction. Both of these requirements are satisfied by the hypothetical phase diagram of FIG. 4A, where the maximum solubility is designated by M. Additionally, the composition of a precipitation-hardenable metal alloy must be less than the maximum solubility M. Examples of some of the binary and ternary metal alloys that are precipitation hardenable include aluminum-calcium, aluminum-chromium, aluminum-cobalt, aluminum-copper, aluminum-iron-titanium, aluminum-gallium-germanium, aluminum-gallium-indium, aluminum-germanium-tin, aluminum-lithium, aluminum-lithium-magnesium, aluminum-manganese, aluminum-molybdenum, aluminum-nickel-titanium, aluminum-niobium, aluminum-silicon, copper-beryllium, copper-tin, magnesium-aluminum, as well as some ferrous alloys.

Figure 4B:
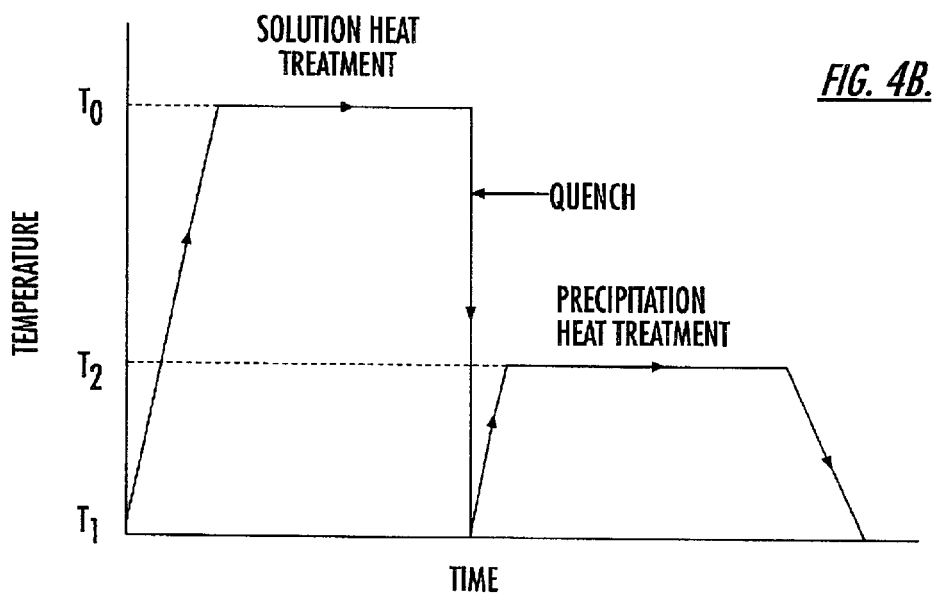
FIG. 4B is a schematic temperature-versus-time plot showing both solution and precipitation heat treatments for precipitation hardening of the hypothetical binary metal alloy system of FIG. 4A.

In the hypothetical binary system illustrated in FIG. 4A, element A designates the original phase matrix, while element B designates the solute or secondary element. To form the uniformly dispersed particles or precipitates of the secondary alloying element within the original phase matrix of the structural member 24, the phase associated with the secondary alloying element must first be completely dissolved, such that the only remaining phase is the phase associated with the original phase matrix. The phase associated with the secondary alloying element is dissolved through a solution heat treatment process at a first predetermined temperature schedule. To illustrate the solution heat treatment process, reference is made to FIG. 4A and the metal alloy composed of a predetermined percentage of elements A and B designated by $C_1$. At ambient temperature, the hypothetical metal alloy of the structural member will be in an equilibrium state and will contain both the α phase of element A and the β phase of element B. During the solution heat treatment process, the temperature of the structural member is raised to temperature $T_0$. At temperature $T_0$, the β phase or solute atoms of element B begin to dissolve. As shown in FIG. 4B, the structural member is maintained at temperature $T_0$ for a sufficient period of time, designated $t_1$, to allow all of the β phase to dissolve so that the alloy contains only the α phase of composition $C_1$.

Once the β phase has completely dissolved, the structural member is rapidly cooled or quenched to ambient temperature, which is designated by $T_1$, as shown in FIGS. 4A and 4B. The rapid cooling inhibits the formation of the β phase so that only the α phase solid solution supersaturated with B atoms is present. However, the structural member in the α phase at this temperature is in a nonequilibrium state with an incomplete temper, such that generally the β phase will gradually begin to form in the existing α phase matrix. In this nonequilibrium state, most metal alloys are relatively soft and weak.

Following solution heat treating, precipitation hardening is completed by precipitation heat treating the structural assembly 22 through natural or artificial aging of the assembly to the desired temper at a predetermined temperature schedule. Referring again to FIGS. 4A and 4B, precipitation heat treating or aging requires that the structural assembly 22 undergo an isothermal heat treatment whereby the temperature of the assembly is raised to a predetermined temperature, designated by $T_2$, for a predetermined amount of time, designated $t_2$. The temperature $T_2$ is within the α and β two-phase region of the hypothetical phase diagram and is a temperature at which the diffusion rates for the B atoms become appreciable. The diffusion of the B atoms into a β phase results in the formation of finely dispersed particles of the B alloy element. Once the desired amount of diffusion has taken place, the structural assembly 22 may be cooled to room temperature.

The character of the β phase particles, and thus the strength and hardness for a given metal alloy used to form the structural assembly 22 is dependent upon the precipitation temperature, designated $T_2$, and the aging time at this temperature, designated $t_2$. Notably, some metal alloys will age at room temperature over an extended period of time, commonly denoted natural aging, while other metal alloys require artificially raised temperatures, commonly denoted artificial aging.

Figure 4C:
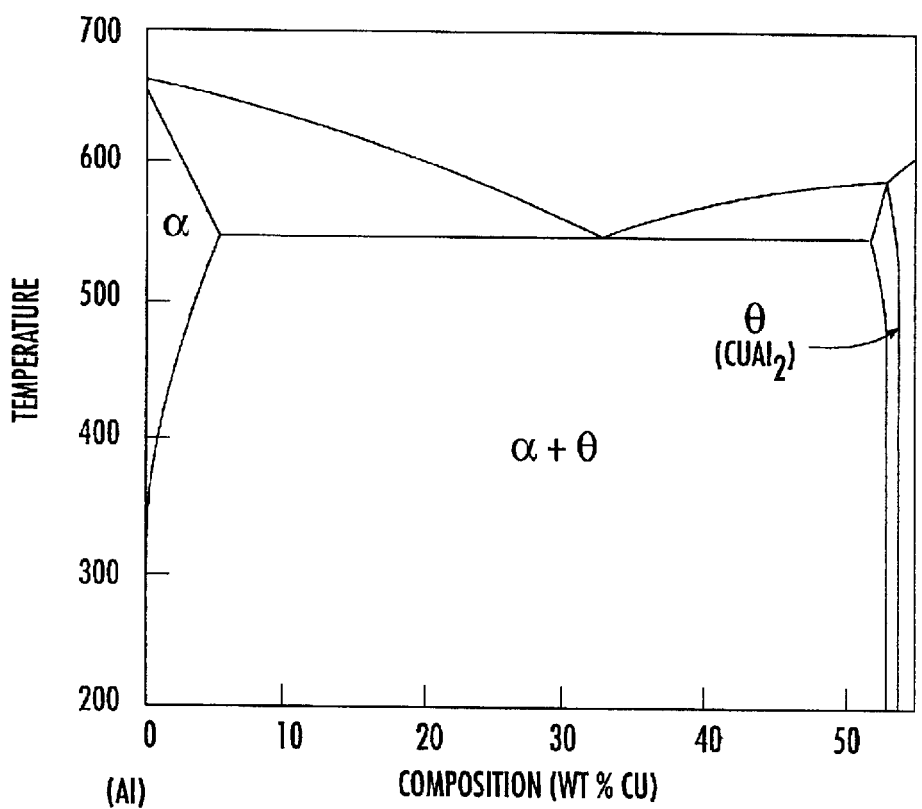
FIG. 4C is a phase diagram for an aluminum-copper metal alloy system.

Referring now to FIG. 4C, there is shown a binary system phase diagram for aluminum and copper adapted from *Metals Handbook: Metallography, Structures and Phase Diagrams*, Vol. 8, 8th edition, ASM Handbook Committee, T. Lyman Editor, American Society for Metals, 1973, p. 259., to further illustrate the solution heat treatment and precipitation heat treatment processes. From the diagram, the temperature range (previously designated $T_0$) to solution heat treat an aluminum-copper metal alloy having a known composition of wt % copper (previously designated $C_1$) so as to completely dissolve the copper atoms can be determined. The time period necessary to completely dissolve the copper atoms, previously designated $t_1$ hours, is dependent upon the material composition, $C_1$, and the temperature, $T_0$, and can be readily determined by those skilled in the art. Upon completing the solution heat treating, the resulting alloy has an incomplete temper and is in a nonequilibrium state. The precipitation heat treatment process is then conducted at a temperature range of approximately 100 to 300° C. (previously designated $T_2$) for $t_2$ hours to complete the temper and stabilize the material properties. The time period, $t_2$, being dependent upon the material composition, $C_1$, and the temperature, $T_2$, and can be readily determined by those skilled in the art.

Figure 5A:
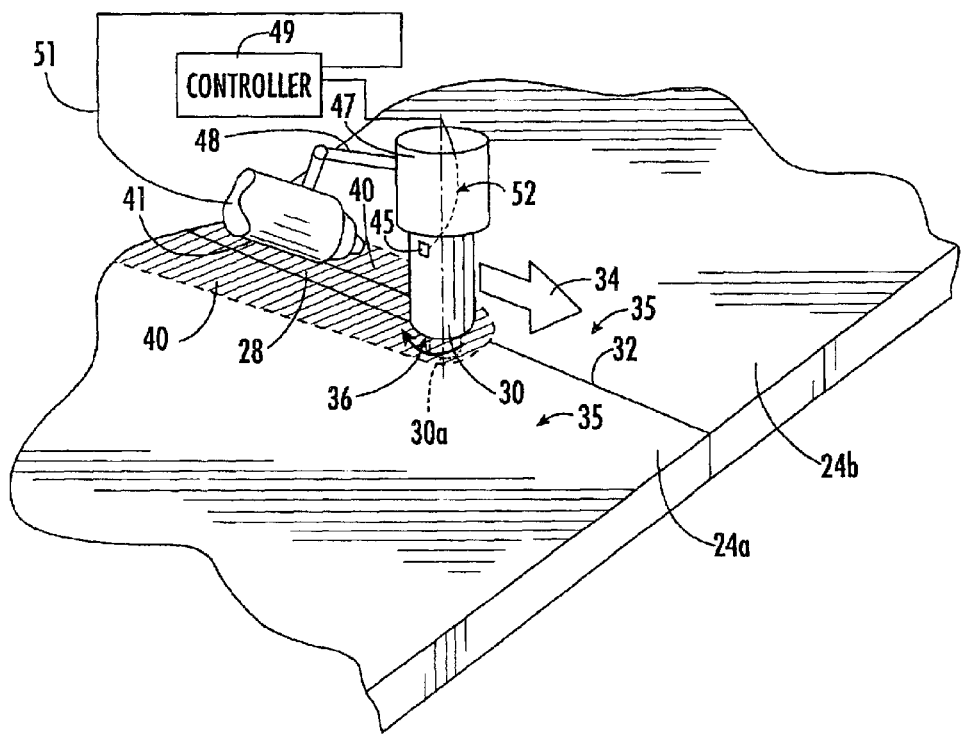
FIG. 5A is a perspective view illustrating the joining of two structural members using friction stir welding, according to one embodiment of the present invention.
Figure 6A:
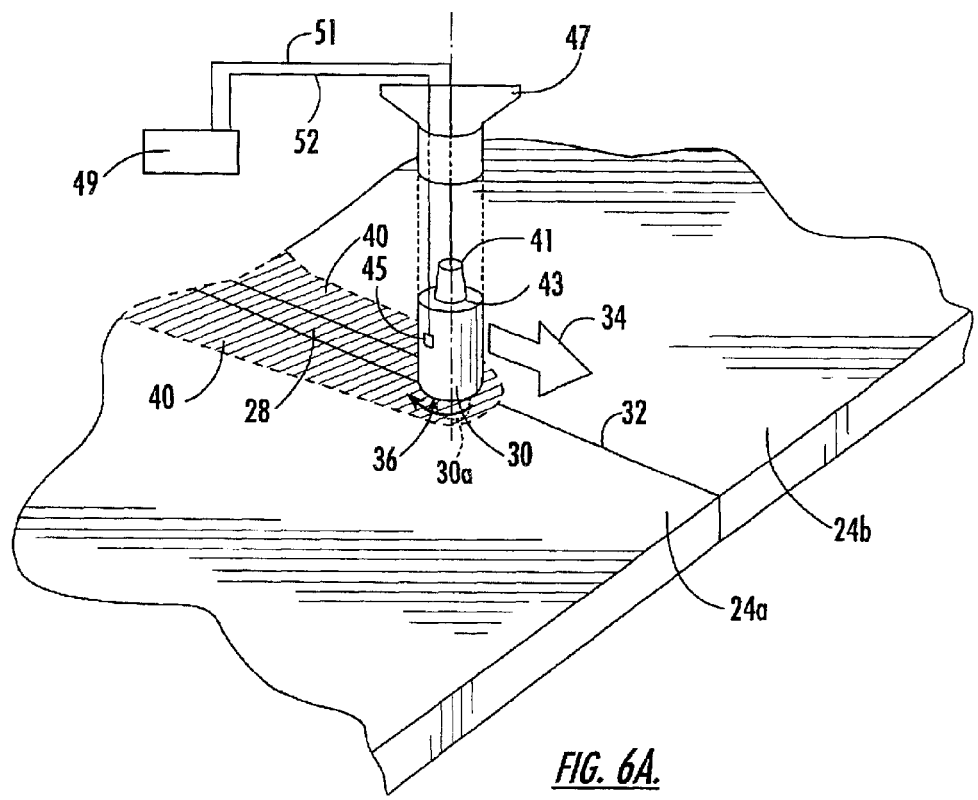
FIG. 6A is a perspective view illustrating the joining of two structural members using friction stir welding, according to another embodiment of the present invention.

Referring again to FIG. 3, the structural assembly 22 includes at least one friction stir weld joint 28 that is formed prior to precipitation hardening of the assembly. As illustrated in FIGS. 5A and 6A, to join structural members 24a, 24b by friction stir welding, the structural members are positioned relative to one another such that the members define an interface 32 therebetween. The structural members 24a, 24b preferably are secured so as to prevent movement of the members relative to one another. For instance, the structural members 24a, 24b can be secured to each other by spot welding or using a clamp, as is known in the art. The structural members 24a, 24b can then be secured to a worktable by means of a clamp or similar device (not shown). When forming a friction stir weld joint 28 in a single structural member 24, the structural member preferably is secured to a worktable by means of a clamp or similar device.

The structural members 24a, 24b are then joined to one another by friction stir welding along the interface 32 between the members, which defines the welding path 34 of the friction stir welding tool 30. For a general discussion of friction stir welding, see U.S. Pat. No. 5,460,317 to Thomas et al., the contents of which are incorporated herein by reference. Specifically, a rotating friction stir welding pin 30a, which is attached to a friction stir welding tool 30 is forced through the outer surfaces 35 of the structural members 24a, 24b. The frictional heat generated by the rotating pin 30a creates a plasticized region or weld zone 36 between the structural members 24a, 24b. A heat-affected region 40 is created about the weld zone 16. The rotating pin 30a is then moved along the path defined by the interface 32 between the structural members 24a, 24b to thereby form a continuous friction stir weld joint 28 along the length of the members, thus forming a unitary-structural assembly 22. A friction stir weld joint 28 can similarly be formed in a single structural member 24 to repair a crack or other defect or to form a region of refined grain structure within a second region of the structural member having comparatively high operational stress. A device having a rotatable spindle, such as a CNC machine, can be used to rotate and move the friction stir welding tool 30, as is known in the art, and such devices are collectively referred to herein as "milling machines" 47.

As illustrated in FIGS. 5A and 6A, the friction stir welding tool 30 is heated using at least one heater 41 prior to and during formation of the friction stir weld joint 28. The temperature or temperature range to which the friction stir welding tool 30 is heated depends on the particular material or materials being welded. For example, for aluminum and aluminum alloys, the friction stir welding tool 30 is heated to between about 600° F. to about 1000° F., and preferably, is heated to about 750° F. Advantageously, it has been found that heating the friction stir welding tool 30 prior to and during friction stir welding inhibits grain growth within the resulting friction stir weld joint 28 during subsequent precipitation hardening of the structural assembly 22. While not intending to be bound by any specific theory, it is believed that friction stir welding imposes a critical amount of cold working on the structural assembly. The cold working results in residual strain in the weld joint that causes grain growth during subsequent solution heat treatments. It is believed that heating the friction stir welding tool prior to and during welding converts the cold working into hot working so that no residual strain occurs in the weld joint and, thus, no appreciable grain growth during subsequent solution heat treatments.

Figure 5B:
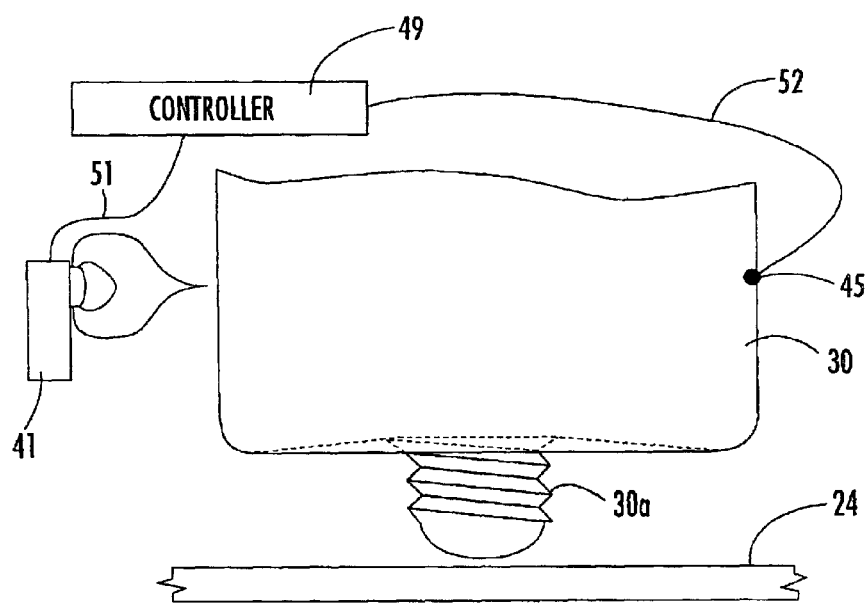
FIG. 5B is an elevation illustrating a friction stir welding tool and a gas torch as the heater, according to one embodiment of the present invention.
Figure 5C:
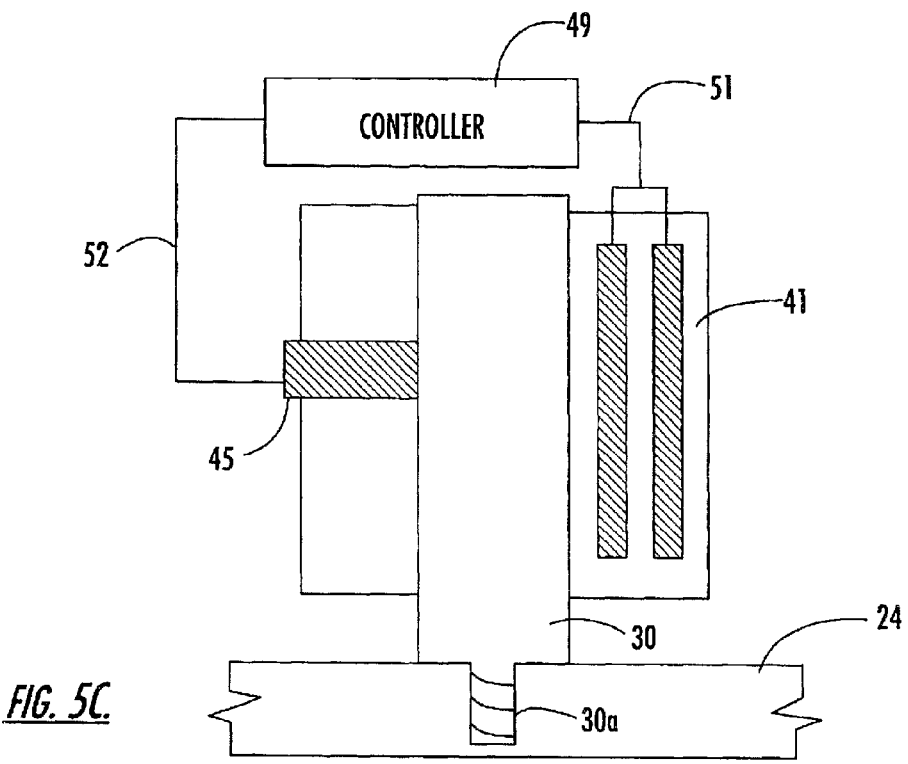
FIG. 5C is an elevation illustrating a friction stir welding tool and a quartz lamp as the heater, according to one embodiment of the present invention.

According to one embodiment of the present invention, as illustrated in FIGS. 5A, 5B and 5C, the heater 41 is positioned externally of the friction stir welding tool 30. The heater 41 can be attached to the milling machine 47 used to rotate and move the friction stir welding tool 30 so that the heater automatically moves with the tool. For example, as illustrated in FIG. 5A, the heater 41 can be attached to a rigid or adjustable arm 48 or the like that is attached to the milling machine 47. Alternatively, the heater 41 can be moved separately from the milling machine 47. In one embodiment (not shown), the heater is moved using a robotic arm controlled by a controller or microprocessor, such as a computer operating under software control. In another embodiment, the heater 41 is moved manually by the operator.

A variety of heaters 41 can be used to externally heat the friction stir welding tool 30. For example, referring to FIG. 5A, the heater 41 can comprises a laser that thermally communicates with, or transfers heat to, the friction stir welding tool 30 primarily by irradiation. In another embodiment, as illustrated in FIG. 5B, the heater 41 comprises a gas torch that transfers heat to the friction stir welding tool 30 by convection and irradiation. For example, the gas torch can use a liquefied hydrocarbon gas as fuel. In yet another embodiment, as illustrated in FIG. 5C, the heater 41 can comprise a quartz lamp that transfers heat to the friction stir welding tool 30 by convection and irradiation. In still another embodiment (not shown), the heater 41 can comprise an induction heating coil positioned at least partially around the friction stir welding tool 30 that transfers heat to the friction stir welding tool by induction.

The position of the heater 41 relative to the friction stir welding tool 30, including the orientation of the heater relative to the direction of travel of the tool and the distance of the heater from the tool, will depend on a variety of factors, including the configuration of the structural member 24 or members 24a, 24b, and the type of heater being used. According to one embodiment, as illustrated in FIG. 5A, the heater 41 is positioned on the trailing side of the tool 30 so that heat is transferred in the direction of travel of the tool, as illustrated by the arrow 34. Alternatively, the heater 41 can be positioned so that it transfers heat toward the tool 34 in a direction perpendicular to the direction of travel of the tool or transfers heat toward the tool in a direction opposite to the direction of tool travel.

Figure 6B:
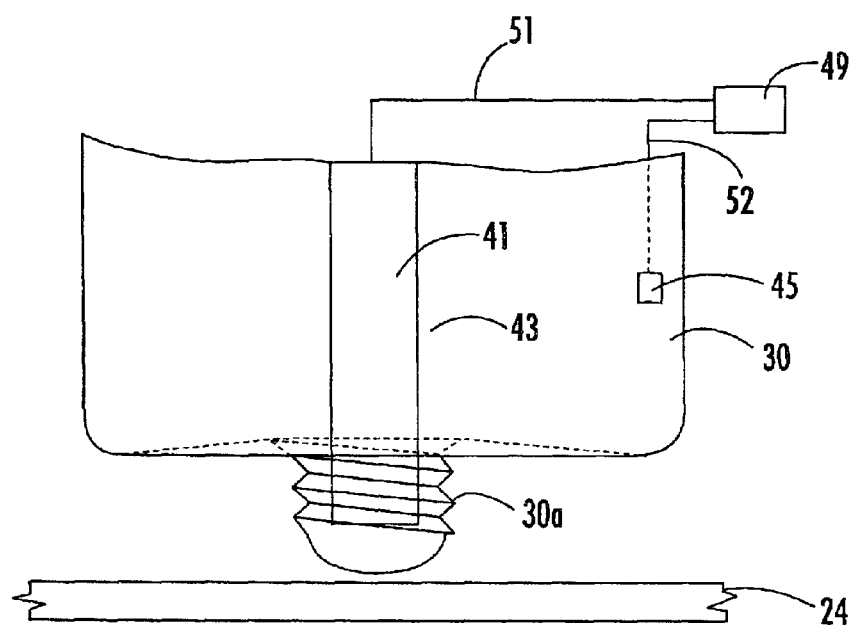
FIG. 6B is an elevation illustrating the friction stir welding tool and resistance heater of FIG. 6A.

According to another embodiment of the present invention, as illustrated in FIGS. 6A and 6B, the heater 41 is positioned at least partially within a cavity or recess 43 defined by the friction stir welding tool 30. For example, the heater 41 can comprise one or more resistance heaters that transfer heat to the friction stir welding tool 30 by conduction and, depending on the size of the cavity, convection. The heater 41 can rotate with the friction stir welding tool 30 within the cavity or recess 43 or the heater can be isolated from the rotation of the friction stir welding tool 30 using bearings (not shown). In the case of one or more resistance heaters, the heaters 41 are preferably in intimate contact with friction stir welding tool 30. In another embodiment (not shown), the heater 41 can comprise a quartz lamp, gas torch or laser positioned within the cavity 43 defined by the friction stir welding tool 30 such that the heater transfers heat to the friction stir welding tool by convection and irradiation. In still another embodiment (not shown), the heater 41 can comprise an induction heating coil positioned within the cavity 43 defined by the friction stir welding tool 30 such that the heater transfers heat to the friction stir welding tool by induction.

The heater 41 includes suitable wiring 51 to connect the heater to an energy source (not shown), as is known in the art. For example, the heater 41 can be powered by the milling machine or by a separate energy source. To avoid electrical shock and to prevent damage to the structural member 24 or members 24a, 24b, the heater 41 preferably is electrically insulated from the structural member or members being welded. The heater 41 can be in electrical communication through suitable wiring 51 with a controller or microprocessor 49, such as a computer operating under computer software control, that is configured to control the heat or energy output of the heater. The controller 49 can include the controller for the milling machine 47. The heat output of the heater 41 can also be manually controlled. In the embodiments in which the heater 41 is positioned within a cavity 43 defined by the friction stir welding tool 30 and the heater rotates with the tool, the wiring 51 preferably includes one or more electrical connectors (not shown) having electrically conductive rollers that continuously conduct electricity to the heater from the power source and/or controller 49, but that allow the portion of the wiring connected to the heater to rotate while the remainder of the wiring remains fixed to thereby prevent the wiring from twisting.

As illustrated in FIGS. 5A, 5B, 5C, 6A and 6B, the friction stir welding tool 30 preferably includes at least one sensor 45, such as a thermocouple, optical thermocouple, thermopile, thermometer, bimetallic temperature-sensitive element, thermoresistive element, resistance temperature detector, thermistors, a pyrometer, that is in thermal communication with the friction stir welding tool 30 for measuring the temperature of the tool prior to and during friction stir welding. The sensor 45 can be attached or mounted directly to the friction stir welding tool 30 using suitable fasteners or adhesive (not shown). Alternatively, an optical thermocouple can be used to monitor the temperature of the friction stir welding tool 30 from a distance. For example, an optical thermocouple can be attached to the milling machine 47 using a rigid or adjustable arm or the like (not shown) so that the optical thermocouple moves with the friction stir welding tool 30 or, alternatively, the optical thermocouple 41 can be moved separately from the milling machine using a robotic arm (not shown) controlled by a controller or microprocessor, such as a computer operating under software control. In another embodiment, the optical thermocouple is moved manually by the operator. The sensor 45 is in electrical communication through suitable wiring 52 with the controller 49. In the embodiments in which the sensor 45 is attached to the friction stir welding tool 30 and the heater rotates with the tool, the wiring 52 preferably includes one or more electrical connectors (not shown) having electrically conductive rollers that continuously conduct the signal from the heater to the power source and/or controller 49, but that allow the portion of the wiring connected to the sensor to rotate while the remainder of the wiring remains fixed to thereby prevent the wiring from twisting.

In operation, the sensor 45 measures the temperature of the friction stir welding tool 30 continuously or at predetermined intervals and then transmits a signal representative of the temperature of the friction stir welding tool to the controller 49. The controller 49 compares the temperature reading from the sensor 45 to a predetermined temperature or value. In response to temperature changes in the friction stir welding tool 30, as measured by the sensor 45 and communicated to the controller 49, the controller will automatically modify the heat output of the heater 41 to thereby modify the temperature of the friction stir welding tool. More specifically, if the temperature of the friction stir welding tool 30, as measured by the sensor 45, is less than the predetermined temperature or value, the controller 49 will increase the heat output of the heater 41 to thereby increase the temperature of the friction stir welding tool. If the temperature of the friction stir welding tool 30, as measured by the sensor 45, is greater than the predetermined temperature or value, the controller 49 will decrease the heat output of the heater 41 to thereby decrease the temperature of the friction stir welding tool.

Figure 3A:
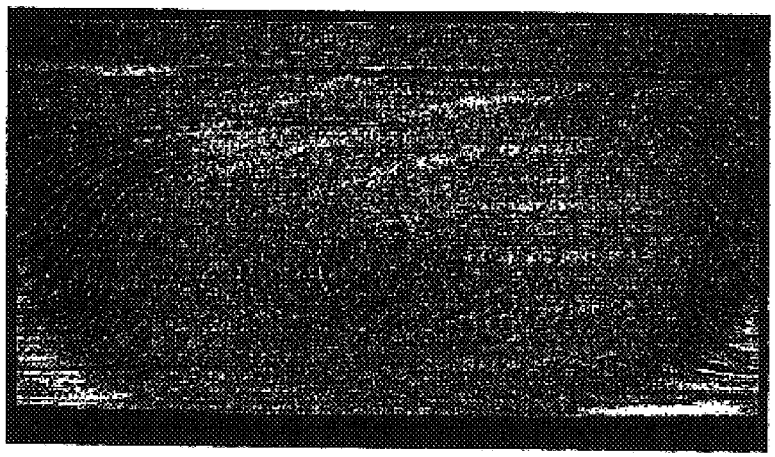
FIG. 3A is a photocopy of a photograph illustrating the grain structure of a friction stir weld joint subsequent to resolution heat treating, according to one embodiment of the present invention.

After the friction stir weld joint or joints are formed, the resulting structural assembly 22 can be resolution heat treated, as described above. Advantageously, the friction stir weld joint or joints 28 will not exhibit appreciable grain growth during or after the resolution heat treatment. As illustrated in FIG. 3A, after the resolution heat treatment, the friction stir weld joint 28 has a refined grain structure having grain size of less than about 5 microns. Upon cooling, the structural assembly 22 may be installed by attaching the assembly to other structural assemblies, so as to form the frame of an aircraft.

Referring now to FIG. 7, there is illustrated the operations performed to form a friction stir weld joint, according to one embodiment of the present invention. The method includes mounting a friction stir welding tool to a rotatable spindle such that the friction stir welding tool rotates with the spindle. See block 61. The friction stir welding tool is heated with a heater to thereby inhibit grain growth in the weld joint. See block 62. The heating step includes transferring heat to the friction stir welding tool through convection, conduction, irradiation, or induction. See block 63. In one embodiment, the heating step includes heating the friction stir welding tool to a temperature between about 600° F. and about 1000° F. See block 64. Subsequent to the heating step, the friction stir welding tool is inserted into at least one structural member. See block 65. The friction stir welding tool is heated concurrently with the inserting step. See block 66. The at least one structural member can be precipitation hardened prior to the inserting step. See block 60. The friction stir welding tool is moved through the at least one structural member to form the friction stir weld joint. See block 67. The temperature of the friction stir welding tool is measured. See block 68. The heat output of the at least one heater is then automatically modified to thereby modify the temperature of the friction stir welding tool. See block 69. The at least one structural member and friction stir weld joint are solution heat treated at a predetermined temperature schedule subsequent to the moving step. See block 70. Thereafter, the at least one structural member and friction stir weld joint are precipitation heat treated by aging at a second predetermined temperature schedule. See block 71.

Figure 8:
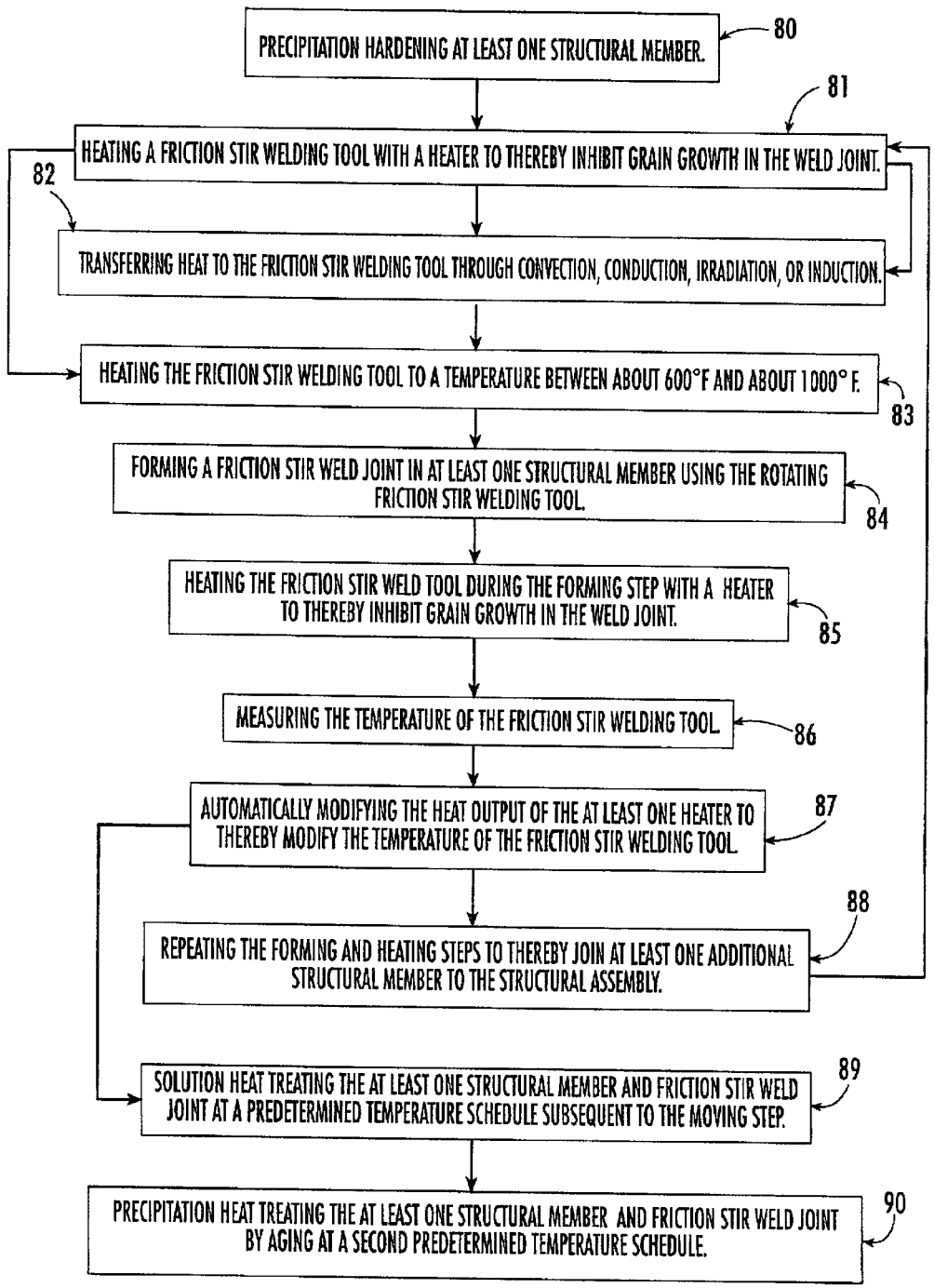
FIG. 8 is a flow chart illustrating a method of manufacturing a structural assembly, according to one embodiment of the present invention.

Referring now to FIG. 8, there is illustrated the operations performed to manufacture a structural assembly. The method includes heating a friction stir weld tool with a heater to thereby inhibit grain growth in the weld joint. See block 81. The heating step includes transferring heat to the friction stir welding tool through convection, conduction, irradiation, or induction. See block 82. In one embodiment, the heating step includes heating the friction stir welding tool to a temperature between about 600° F. and about 1000° F. See block 83. A friction stir weld joint is then formed in at least one structural member using the rotating friction stir welding tool. See block 84. The at least one structural member can be precipitation hardened at a predetermined temperature schedule prior to the forming step. See block 80. The friction stir weld tool is heated during the forming step with a heater to thereby inhibit grain growth in the weld joint. See block 85. The temperature of the friction stir welding tool is measured. See block 86. The heat output of the at least one heater can then be automatically modified to thereby modify the temperature of the friction stir welding tool. See block 87. In one embodiment, the forming and heating steps are repeated to thereby join at least one additional structural member to the structural assembly. See block 88. The structural assembly is solution heat treated at a predetermined temperature schedule subsequent to the forming step. See block 89. Thereafter, the structural assembly is precipitation heat treated by aging at a second predetermined temperature schedule. See block 90.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A precipatation hardened structural assembly comprising:
   a first structural member;
   a second structural member positioned adjacent to said first structural member such that said first and second structural members define an interface therebetween; and
   at least one friction stir weld joint joining said first structural member to said second structural member at least partially along said interface, said first and second structural members being solution heat treated at a first predetermined temperature schedule and then precipitation heat treated at a second predetermined temperature schedule, said friction stir weld joint being formed subsequent to the precipitation hardening of the first and second structural members at the second predetermined temperature schedule, and wherein said friction stir weld joint comprises a refined grain structure having grain size of less than about 5 microns and substantially no residual strain so as to inhibit grain growth during post-weld heat treatments.

2. A precipitation hardened structural assembly according to claim 1 wherein said first and second structural members comprise dissimilar materials.

3. A precipitation hardened structural assembly according to claim 1 where at least one of said first and second structural members is formed from materials selected from the group consisting of aluminum, aluminum alloys, titanium, and titanium alloys.

4. An apparatus for attachment to a rotatable spindle for forming a friction stir weld joint, comprising:
   a friction stir welding tool in rotatable communication with the spindle, said friction stir welding tool defining a cavity; and
   at least one heater adapted to thermally communicate with said friction stir welding tool to thereby heat said tool, said at least one heater being at least partially received in said cavity of said friction stir welding tool.

5. An apparatus according to claim 4 wherein said at leas one heater is selected from the group consisting of a resistance heating coil, an induction heating coil, a quartz lamp, a gas torch, and a laser.

6. An apparatus according to claim 4 wherein said at least one heater thermally communicates with said friction stir welding tool through heat transfer selected from the group consisting of convection, conduction, irradiation and induction.

7. An apparatus according to claim 4 further comprising a sensor in thermal communication with said friction stir welding tool for measuring the temperature of said friction stir welding tool.

8. An apparatus according to claim 7 further comprising a controller in electrical communication with said sensor and in operable communication with said at least one heater, said controller configured to automatically modify the heat output of said at least one heater to modify the temperature of said friction stir welding tool.

9. An apparatus for friction stir welding at least one structural member, comprising:
   a machine having a rotatable spindle;
   a friction stir welding tool in rotatable communication with said spindle; and
   at least one heater adapted to thermally communicate with said friction stir welding tool to thereby heat said tool, said at least one heater being structured so as to be electrically insulated from the at least one structural member.

10. An apparatus according to claim 9 wherein said at least one heater is selected from the group consisting of a resistance heating coil, an induction heating coil, a quartz lamp, a gas torch, and a laser.

11. An apparatus according to claim 9 wherein said friction stir welding tool defines a cavity adapted to at least partially receive said at least one heater.

12. An apparatus according to claim 9 wherein said at least one heater thermally communicates with said friction stir welding tool through heat transfer selected from the group consisting of convection, conduction, irradiation and induction.

13. An apparatus according to claim 9 wherein said at least one heater is spaced from said friction stir welding tool.

14. An apparatus according to claim 9 further comprising a sensor in thermal communication with said friction stir welding tool for measuring the temperature of said friction stir welding tool.

15. An apparatus according to claim 14 further comprising a controller in electrical communication with said sensor and in operable communication with said at least one heater, said controller configured to automatically modify the heat output of said at least one heater to modify the temperature of said friction stir welding tool.

16. A method of forming a friction stir weld joint, comprising;
   mounting a friction stir welding tool to a rotatable spindle such that the friction stir welding tool rotates with the spindle;
   heating the friction stir welding tool with at least one heater to thereby inhibit grain growth in the weld joint;
   subsequent to said heating step, inserting the friction stir welding tool into at least one structural member; and
   moving the friction stir welding tool through the at least one structural member to form the friction stir weld joint.

17. A method according to claim 16 further comprising heating the friction stir welding tool concurrently with said inserting step.

18. A method according to claim 16 further comprising precipitation hardening the at least one structural member at a predetermined temperature schedule prior to said inserting stop.

19. A method according to claim 16 further comprising solution heat treating the at least one structural member and friction stir weld joint at a predetermined temperature schedule subsequent to said moving step.

20. A method according to claim 19 further comprising precipitation heat treating the at least one structural member and friction stir weld joint by aging at a second predetermined temperature schedule.

21. A method according to claim 16 wherein said heating step comprises transferring heat to the friction stir welding tool through heat transfer selected from the group consisting of convection, conduction, irradiation, and induction.

22. A method according to claim 16 wherein said heating step comprises heating the friction stir welding tool to a temperature between about 600° F. and about 1000° F.

23. A method according to claim 16 further comprising measuring the temperature of the friction stir welding tool.

24. A method according to claim 23 further comprising automatically modifying the heat output of the at least one heater to thereby modify the temperature of the friction stir welding tool.

25. A method of manufacturing a structural assembly, comprising:
   forming a friction stir weld joint in at least one structural member using a rotating friction stir welding tool to construct the structural assembly; and
   heating the friction stir weld tool prior to and during said forming step with at least one heater to thereby inhibit grain growth in the weld joint.

26. A method according to claim 25 further comprising repeating said forming and heating steps to thereby join at least one additional structural member to the structural assembly.

27. A method according to claim 25 further comprising precipitation hardening the at least one structural member at a predetermined temperature schedule prior to said forming step.

28. A method according to claim 25 further comprising solution heat treating the structural assembly at a predetermined temperature schedule subsequent to said forming step.

29. A method according to claim 28 further comprising precipitation heat treating the structural assembly by aging at a second predetermined temperature schedule.

30. A method according to claim 25 wherein said heating step comprises transferring heat to the friction stir welding tool through heat transfer selected from the group consisting of convection, conduction, irradiation, and induction.

31. A method according to claim 25 wherein said heating step comprises heating the friction stir welding tool to a temperature between about 600° F. and about 1000° F.

32. A method according to claim 25 further comprising measuring the temperature of the friction stir welding tool.

33. A method according to claim 32 further comprising automatically modifying the heat output of the at least one heater to thereby modify the temperature of the friction stir welding tool.

* * * * *

UNITED STATES PATENT AND TRADEMARK OFFICE
CERTIFICATE OF CORRECTION

| | | |
|---|---|---|
| PATENT NO. | : 6,780,525 B2 | Page 1 of 1 |
| APPLICATION NO. | : 10/035865 | |
| DATED | : August 24, 2004 | |
| INVENTOR(S) | : Litwinski | |

It is certified that error appears in the above-identified patent and that said Letters Patent is hereby corrected as shown below:

Column 5,
Line 61, "09/589,505 filed on Jun. 7, 2001" should read --09/589,504 filed on Jun. 7, 2000--.

Signed and Sealed this

Twenty-seventh Day of March, 2007

JON W. DUDAS
*Director of the United States Patent and Trademark Office*